US012164309B2

(12) United States Patent
Choi et al.

(10) Patent No.: US 12,164,309 B2
(45) Date of Patent: Dec. 10, 2024

(54) DRONE CONTROL SYSTEM AND INTELLIGENT DRONE FLIGHT PLANNING METHOD THEREOF

(71) Applicant: CLROBUR Co., Ltd., Incheon (KR)

(72) Inventors: Tae In Choi, Gunpo-si (KR); Seong Won Jo, Incheon (KR)

(73) Assignee: CLROBUR Co., Ltd., Incheon (KR)

( * ) Notice: Subject to any disclaimer, the term of this patent is extended or adjusted under 35 U.S.C. 154(b) by 426 days.

(21) Appl. No.: 17/537,063

(22) Filed: Nov. 29, 2021

(65) Prior Publication Data

US 2022/0147066 A1   May 12, 2022

Related U.S. Application Data

(63) Continuation of application No. PCT/KR2021/006811, filed on Jun. 1, 2021.

(51) Int. Cl.
  *G05D 1/00* (2024.01)
  *B64C 39/02* (2023.01)
  *B64D 45/00* (2006.01)
  *G01C 21/00* (2006.01)
  *G08G 5/00* (2006.01)

(52) U.S. Cl.
  CPC ......... *G05D 1/1062* (2019.05); *B64C 39/024* (2013.01); *B64D 45/0034* (2019.08); *G01C 21/005* (2013.01); *G05D 1/00* (2013.01); *G08G 5/003* (2013.01); *G08G 5/0069* (2013.01); *G08G 5/0091* (2013.01); *B64U 2201/104* (2023.01); *G08G 5/006* (2013.01)

(58) Field of Classification Search
  CPC ............ B64C 39/024; B64U 2201/104; B64U 2201/20; G05D 1/00; G08G 5/003; G08G 5/0069; G08G 5/0091; G08G 5/006; B64D 45/0034
  See application file for complete search history.

(56) References Cited

U.S. PATENT DOCUMENTS

| 2017/0337824 | A1* | 11/2017 | Chen ................. G08G 5/0086 |
| 2018/0025649 | A1* | 1/2018 | Contreras ............ G05D 1/0061 |
|  |  |  | 701/3 |
| 2019/0101934 | A1 | 4/2019 | Tuukkanen et al. |
| 2021/0125507 | A1* | 4/2021 | Haider ................ G08G 5/0026 |

FOREIGN PATENT DOCUMENTS

| EP | 3 531 222 A1 | 8/2019 |
| KR | 10-2016-0074895 A | 6/2016 |

* cited by examiner

*Primary Examiner* — Tyler J Lee
*Assistant Examiner* — Kimia Kohankhaki
(74) *Attorney, Agent, or Firm* — Studebaker & Brackett PC

(57) ABSTRACT

According to the present invention, a drone control system includes: a flying drone; a cloud server configured to transmit and receive information to and from the drone by wireless communication; and a ground control system configured to establish a flight plan of the drone by connecting the drone and the cloud server by the wireless communication.

15 Claims, 7 Drawing Sheets

DRONE CONTROL SYSTEM AND INTELLIGENT DRONE FLIGHT PLANNING METHOD THEREOF

CROSS-REFERENCE TO RELATED APPLICATIONS

The present application is a continuation of International Patent Application No. PCT/KR2021/006811, filed on Jun. 1, 2021, which is based upon and claims the benefit of priority to Korean Patent Application No. 10-2020-0026071, filed on Mar. 2, 2020. The disclosures of the above-listed applications are hereby incorporated by reference herein in their entirety.

TECHNICAL FIELD

The present invention relates to a drone control system and intelligent drone flight planning method thereof that extract a change in a height of a ground on a flight path from map data and reflects the change to a flight plan, and more particularly, to a drone control system and intelligent drone flight planning method thereof that enable a drone to perform its mission while flying at a certain distance from the ground at all times regardless of the change in the height of the ground when flying within a drone flight zone by reflecting altitude data such as terrain contour data according to position information of a drone flight path to establish an intelligent flight plan.

BACKGROUND ART

In general, a drone refers to an unmanned aerial vehicle that flies through remote control on the ground without a human being on the aircraft.

A drone is operated by setting a flight path based on an open source flight controller and using the set flight path. In order to operate the drone, when a suitable drone is selected according to a flight zone, a flight plan including a flight path and a flight height of the drone is fixed, and related data is transmitted to the drone, the drone flies at a fixed height and in a fixed flight path.

The flight plan is established based on the flight height and flight path of the drone according to the purpose of the operation of the drone, and is generally established so that the flight is made at a height higher than maximum heights of buildings, ground structures, or mountains in order to prevent collision because it is difficult to reflect changes in heights of terrain features to the flight height of the drone when establishing the flight plan including the flight path.

However, if migratory bird habitats including slopes of mountains, hills, or the like are set as a flight zone for quarantine/prevention, in order to increase efficiency of the epidemic prevention, it is very important to adjust the flight height of the drone in a situation where it is necessary to spray chemicals while maintaining a height close to the ground, for example, 1 m. When setting the flight path of the existing drone, the flight height is determined based on a height of a take-off point, and therefore, when the slope is quarantined, it will be impossible to maintain a certain height from the ground when the flight height of the drone cannot be adjusted according to the change in the height of the ground. Since it is difficult to reflect the change in the height of the ground when establishing the flight plan, even if the height of the ground is changed, it was common to have the drone fly at an altitude higher than the height of the terrain features in order to prevent collision with terrains or terrain features. In the case of carrying out prevention using a drone, there were problems in that the height from the ground could not be maintained at a constant level, resulting in poor quarantine work or a high loss rate of chemicals.

To improve this, a drone operator may adjust an altitude one by one according to situations while watching a screen transmitted from the drone or a drone operation status, but when the flight plan of the drone is set in advance and the drone goes into autonomous flight mode, it is difficult to adjust the altitude, and it is not easy to change and set the altitude one by one in a situation where the drone is flying from a distance.

In the existing drone operating system, it may be considered inputting the change in the height of the ground on the flight path to reflect the altitude of the drone, but it is difficult to separately input data related to ground height information for each flight point because the drone operator cannot know height conditions according to the position of the drone. Therefore, the existing problems may be solved when the flight plan is established by securing height data from a map database and reflecting the height data according to the drone flight path in the drone operation plan.

As a prior document related to the present invention, there is Korean Patent laid-Open Publication No. 10-2016-0074895 (Jun. 29, 2016), and the prior document discloses a method and apparatus for updating a flight path of a drone, but relates to a method of modifying or updating a route by collecting information on operation restrictions on a route, which may be different from the content of this patent, in which an altitude on a flight path is secured from map data and reflected to a flight plan to allow the drone to fly at a certain altitude from a ground.

DISCLOSURE

Technical Problem

An object of the present invention provides a drone control system and an intelligent drone flight planning method thereof that enable a drone to be stably operated and perform its mission while maintaining a certain distance from a ground at all times even when the drone is operated not only on hills but also in mountainous areas with slopes by easily setting a flight path of the drone reflecting a height of a ground, and for this purpose, enable the drone to fly while maintaining a certain distance from slopes of mountains or hills by applying its own algorithm setting a flight path of the drone by combining GPS information on the flight path and contour information of a geographic information system when setting the flight path of the drone to reflect a change in a height of a ground to a flight height of the drone.

Technical Solution

According to the present invention, a drone control system includes: a flying drone; a cloud server configured to transmit and receive information to and from the drone by wireless communication; and a ground control system configured to establish a flight plan of the drone by connecting the drone and the cloud server by the wireless communication, in which the ground control system includes: a flight plan derivation algorithm configured to derive the flight plan by reflecting a contour line and building height data stored in the cloud server in real time according to a flight start point and a flight end point of the drone, and reflecting height data set by a user for mission performance of the drone when setting the flight path of the drone; a flight result analysis processing unit configured to check changed map data or the flight plan, and process whether a DB is reflected by comparing and analyzing simulated flight and the flight plan of the drone and an actual flight result of the drone; and a flight simulator configured to check whether the drone flies at a certain altitude without abnormality according to a change in altitude of a ground during actual flight of the drone according to the flight plan by performing flight simulation through the flight plan DB stored in the cloud server.

The drone may include a flight information collection unit configured to collect the actual flight coordinates of the drone to understand effects of changes in atmospheric environment during mission performance according to the flight plan and collect data for comparing with the flight plan or flight simulation content to secure data for modifying the flight plan during a next flight of the drone in a similar environment.

The flight result analysis processing unit may include a flight result comparison analysis algorithm that compares and analyzes whether the drone actually performs the flight according to the flight plan after completing the mission performance of the drone, and the flight result comparison analysis algorithm may compare and analyze the flight plan and flight result, and modify the flight plan when the result of comparison analysis of the flight plan and flight result is out of a preset normal range.

The flight result comparison analysis algorithm may collect the flight coordinates of the drone according to the flight plan from the cloud server, and collect log data set obtained from the actual flight of the drone, and extract a virtual flight data set through the flight simulation according to the flight coordinates, and compare and analyze the actual flight log data set and virtual flight data set of the drone.

The flight result comparison analysis algorithm may reflect an external factor of wind and an obstacle object based on the flight coordinates in an abnormal situation where a position, speed, and altitude determined as a result of analyzing the flight plan and the flight result do not match a predicted range to update the flight plan by modifying the flight coordinate, speed, a mission type, and control commands accordingly, and may generate an update history and analysis data of the corresponding flight plan and store the generated update history and analysis data in the cloud server.

The cloud server may include: a weather information collection unit configured to collect real-time weather information of a flight zone in which the drone flies; a map data storage unit configured to update and store map data including a contour line and building height data of a terrain of the flight zone in which the drone flies; a flight plan DB storage unit configured to reflect real-time map data when setting the flight zone and the flight path to which the drone flies, and store the flight plan reflecting the height data set by a user for mission performance; a flight analysis DB storage unit configured to store a DB obtained by analyzing the simulated flight, the flight plan, and the actual flight result of the drone; and an integrated DB processing unit configured to be connected to the weather information collection unit, the map data storage unit, the flight plan DB storage unit and the flight analysis DB storage unit to manage the DB in an integrated manner.

The flight simulator may call the flight plan DB stored in the cloud server to check the flight plan, display a virtual drone image in a virtual space corresponding to the area set in the flight plan, and vary a position of the virtual drone image based on the altitude, speed, time, direction, and the like of the drone set in the flight plan to perform the simulation.

An intelligent flight planning method includes: setting a type of drone according to a flight characteristic of the drone; setting a flight zone in which the set drone flies; setting a flight path of the drone by reflecting real-time weather information in the set flight zone; applying a flight plan derivation algorithm for reflecting a height extracted from map data to the flight path of the drone; deriving a flight plan reflecting a flight height set by a user to the flight path according to the flight plan derivation algorithm; storing the flight plan derived through the deriving of the flight plan in a cloud server and transmitting the flight plan to the drone; performing a mission of the drone according to the flight plan and collecting flight information; and comparing and analyzing the flight plan, an actual flight result, and a simulated flight result, and storing the flight result.

The intelligent drone flight planning method may further include: after the storing of the flight plan and the transmitting of the drone, selecting whether to perform flight simulation through the flight plan stored in the cloud server.

The intelligent flight planning method may further include: after the performing of the mission of the drone and collecting of the flight information, selecting whether to compare and analyze the flight result; and additionally selecting whether to perform a mission to be additionally performed.

In the setting of the flight zone of the drone, when setting the flight zone in which the drone flies, the flight zone information may be reflected by collecting weather information of the set flight zone from real-time weather information of the cloud server.

In the applying of the flight plan derivation algorithm, when setting a scheduled flight path in which the drone flies, map data according to the set flight path may be collected from the real-time map data of the cloud server, and a change in a height of a ground on the flight path may be reflected to the flight plan.

In the selecting whether to perform the flight simulation, when the flight simulation is performed, it may be checked whether the drone flies while maintaining a certain distance from the ground without abnormality according to a change in altitude of the ground during actual flight according to the flight plan established by reflecting the change in the height of the ground, and if it is checked that there is no problem, it may proceed to the performing of the mission of the drone and the collecting of the flight information according to the flight plan uploaded to the drone.

In the performing of the mission of the drone and the collecting of the flight information, the actual flight coordinates of the drone is collected to understand effects of changes in atmospheric environment during the mission performance of the drone, and data for comparing with the flight plan of the drone or flight simulation content of the drone may be collected to secure data for modifying the flight plan during a next flight of the drone in a similar environment.

The performing of the mission of the drone and the collecting of the flight information may include collecting data such as the position and the flight path of the drone during the mission performance of the drone and information of a distance from the ground through a distance measurement sensor of the drone.

The comparing and analyzing of the flight result and the storing of the flight information may include checking whether the actual drone flies normally according to the flight path in the planned flight plan or the simulated flight path due to a change in external atmospheric environment including an effect of wind during the actual flight of the drone, and if there is a difference, analyzing in which part there is the difference.

Advantageous Effects

As described above, according to the present invention, it is possible to allow a drone to fly while maintaining a certain distance from a ground at all times even if a height of a ground is changed by reflecting contour height data of a geographic information system in setting a flight path of a drone to establish a flight plan, and thus, increase chemicals spraying effect and reduce the amount of chemicals used by spraying the chemicals while maintaining the certain distance from the ground or the forest at all times when spraying the chemicals for prevention of migratory bird habitats including slopes, forest with the change in the height of the ground, or the like.

BEST MODE

Hereinafter, preferred embodiments of the present invention will be described in detail with reference to the accompanying drawings.

Advantages and features of the present invention and methods accomplishing them will become apparent from the following description of exemplary embodiments with reference to the accompanying drawings.

However, the present invention is not limited to exemplary embodiments to be described below, but may be implemented in various different forms, these exemplary embodiments will be provided only in order to make the present disclosure complete and allow those skilled in the art to completely recognize the scope of the present invention, and the present invention will be defined by the scope of the claims.

Further, in describing the present invention, in the case in which it is decided that the well-known art related to the present invention may obscure the gist of the present invention, a detailed description for the well-known art will be omitted.

Figure 1:
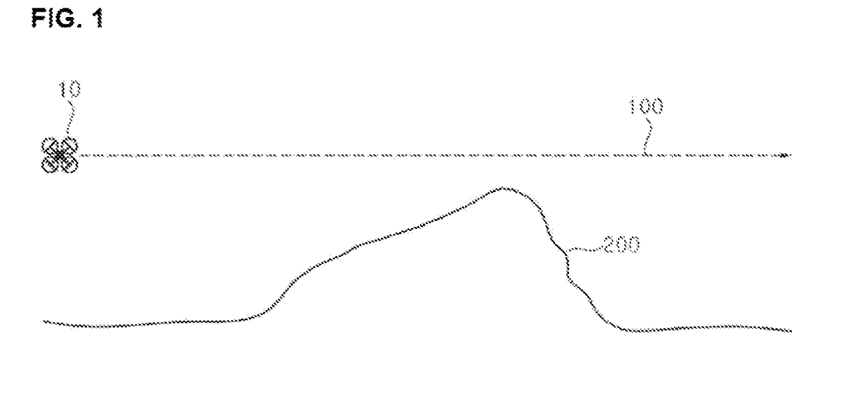
FIG. 1 is a diagram illustrating a flight path of a general drone that does not reflect a change in a height of a terrain, and illustrating that the drone flies at a certain height starting from a point where the drone first takes off.
Figure 2:
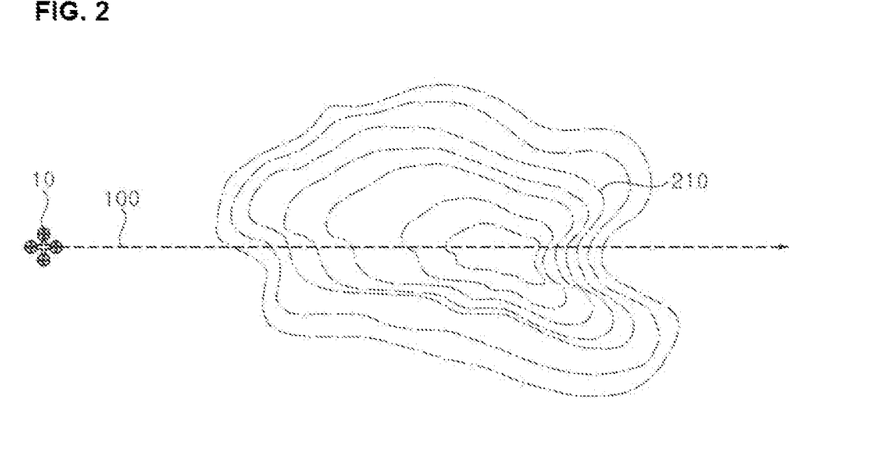
FIG. 2 is a diagram illustrating a flight path of a drone in which the drone flies over a mountain-like terrain (represented by a contour line) in FIG. 1.
Figure 3:
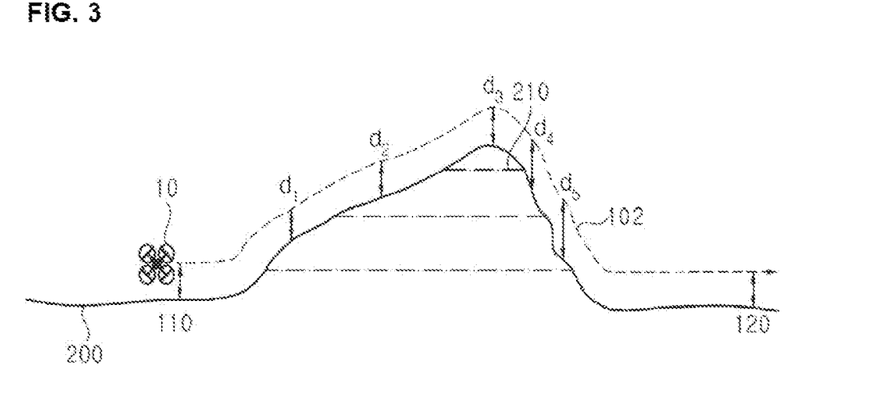
FIG. 3 is a diagram illustrating that the drone flies while maintaining the certain height from the ground according to a flight plan reflecting altitude map data according to the present invention.
Figure 4:
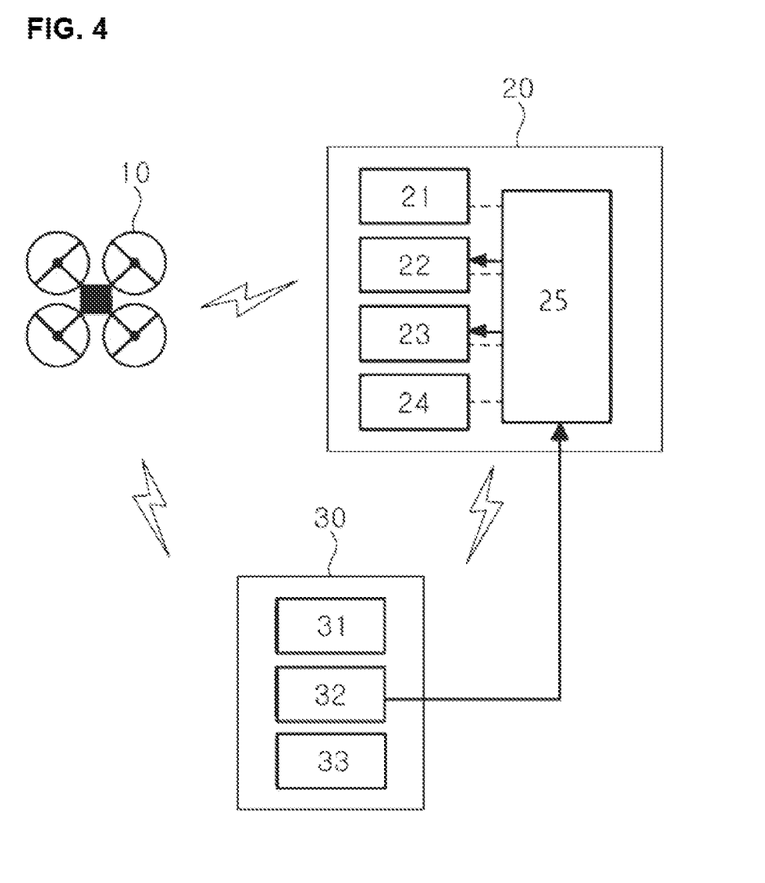
FIGS. 4 and 5 are conceptual views illustrating a drone control system according to the present invention.
Figure 5:
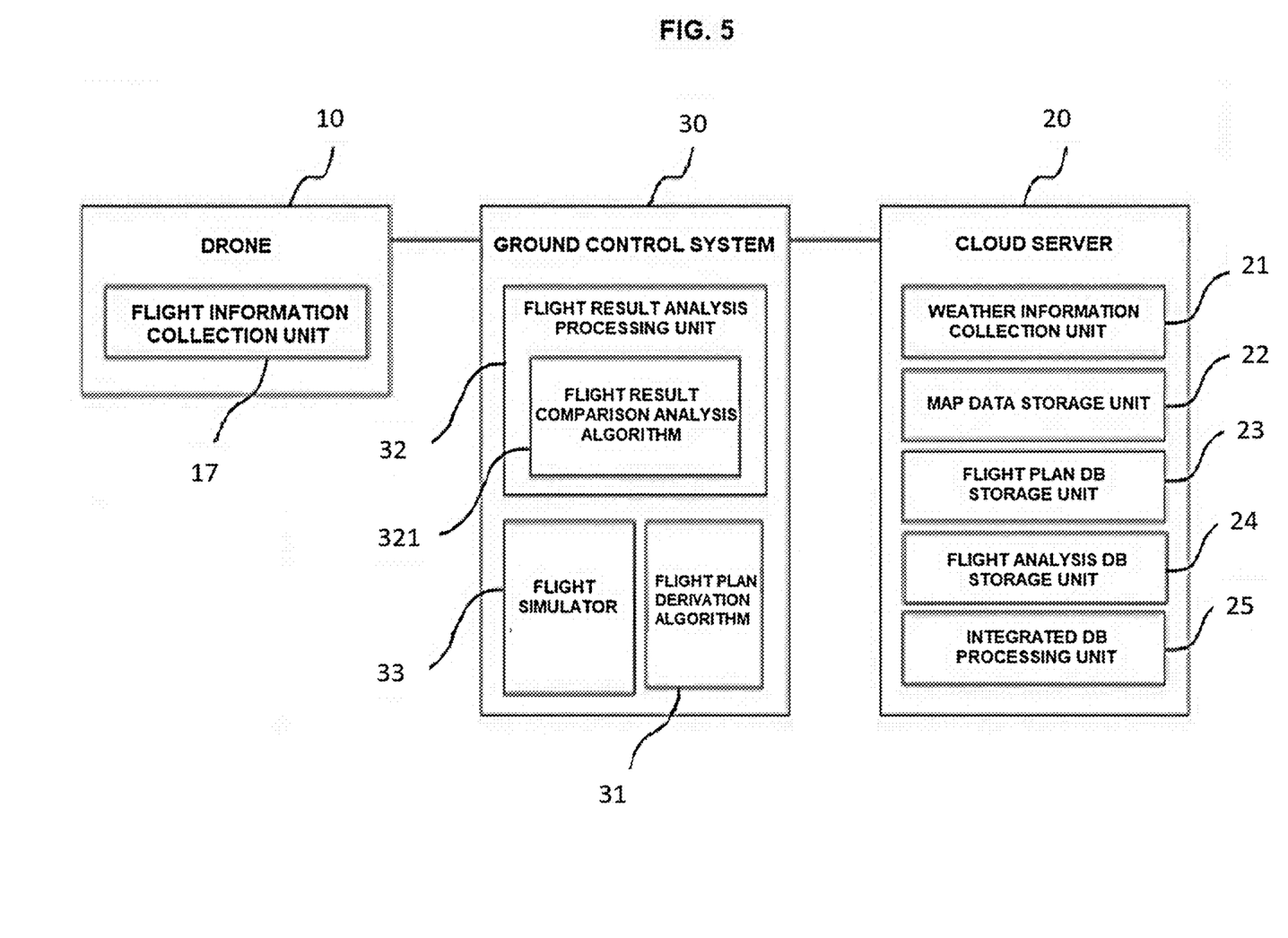
Figure 6:
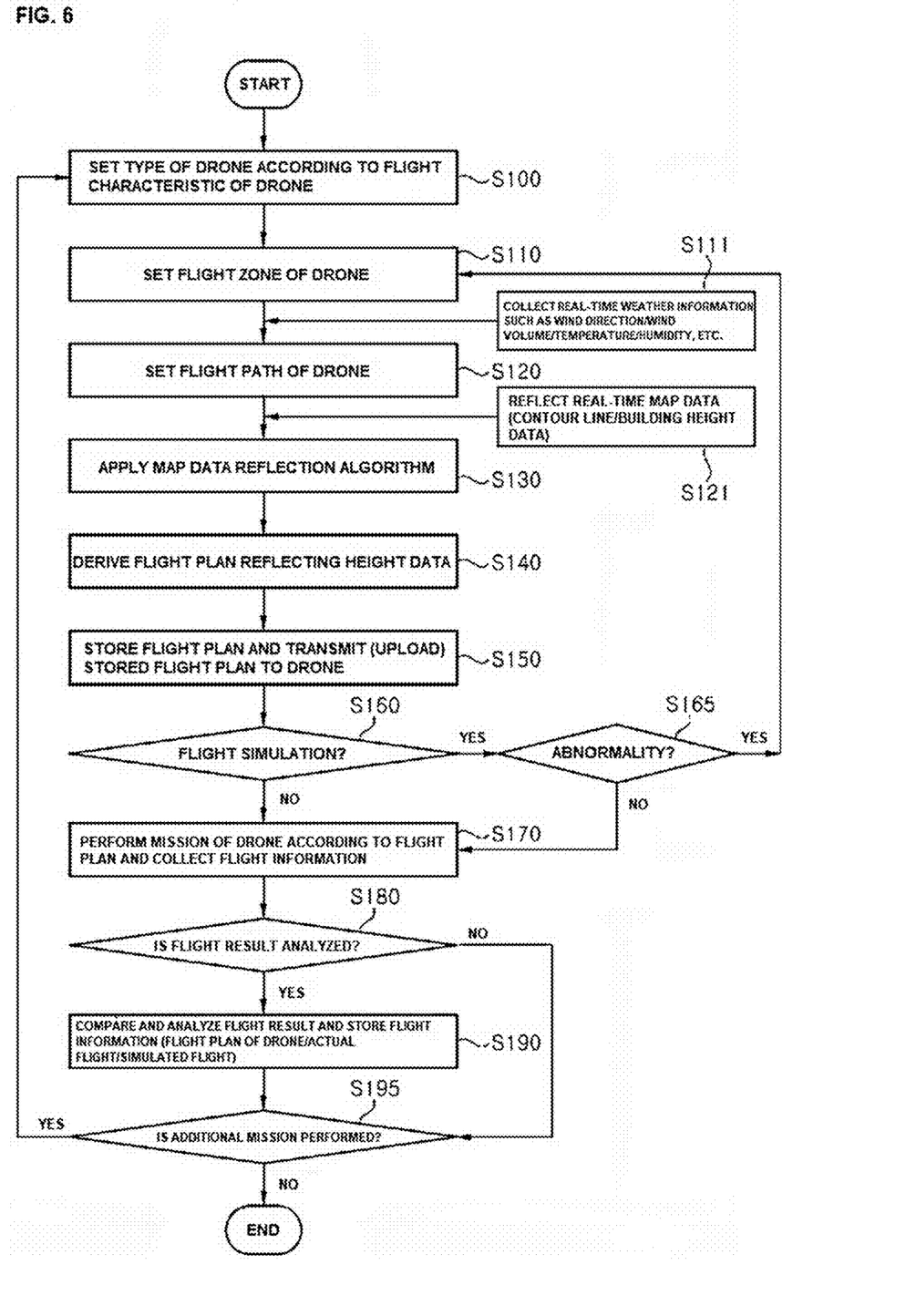
FIG. 6 is a diagram illustrating a detailed sequence of flight planning and drone operation reflecting drone map data according to an embodiment of the present invention.
Figure 7:
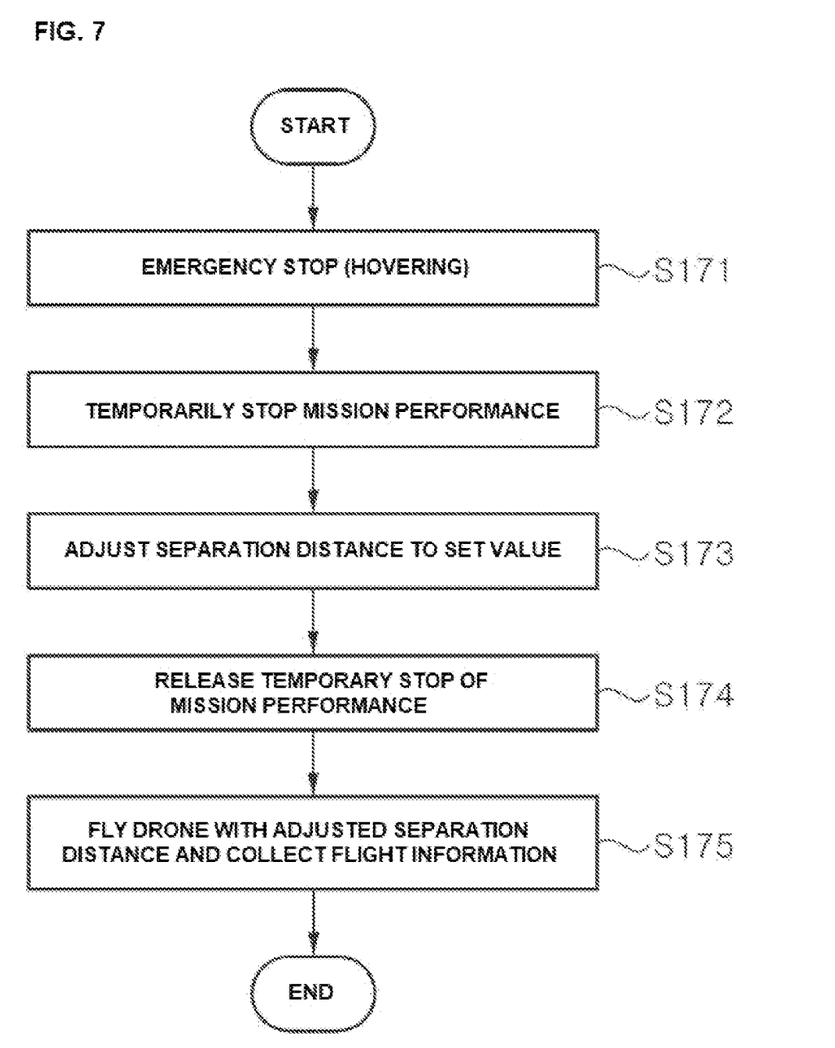
FIG. 7 is a diagram illustrating a detailed sequence of drone mission performance and flight information collection steps according to an embodiment of the present invention.
Figure 8:
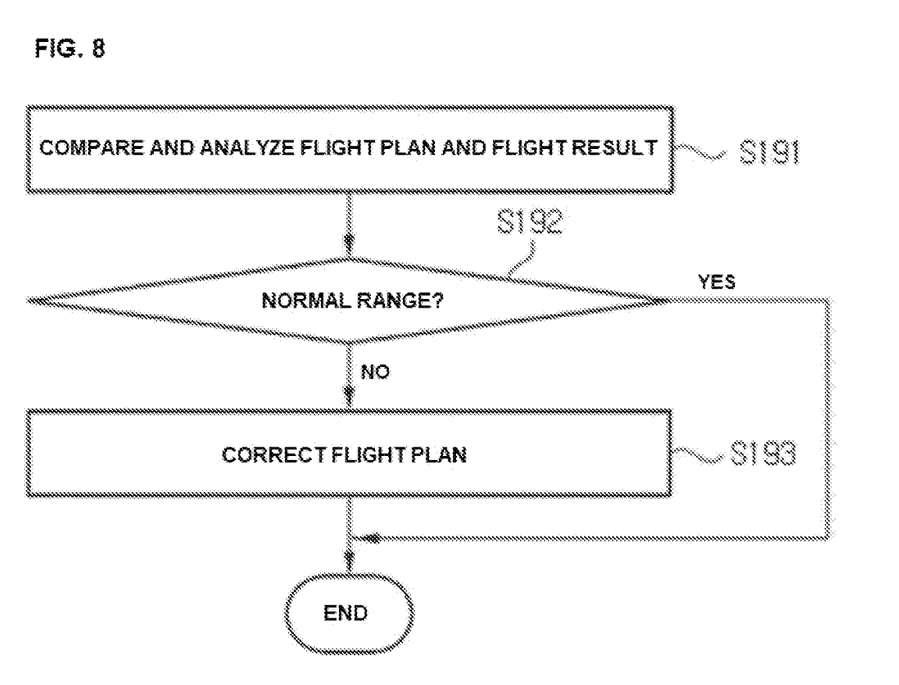
FIG. 8 is a diagram illustrating a detailed sequence of flight result comparison analysis and flight information storing steps according to an embodiment of the present invention.
Figure 9:
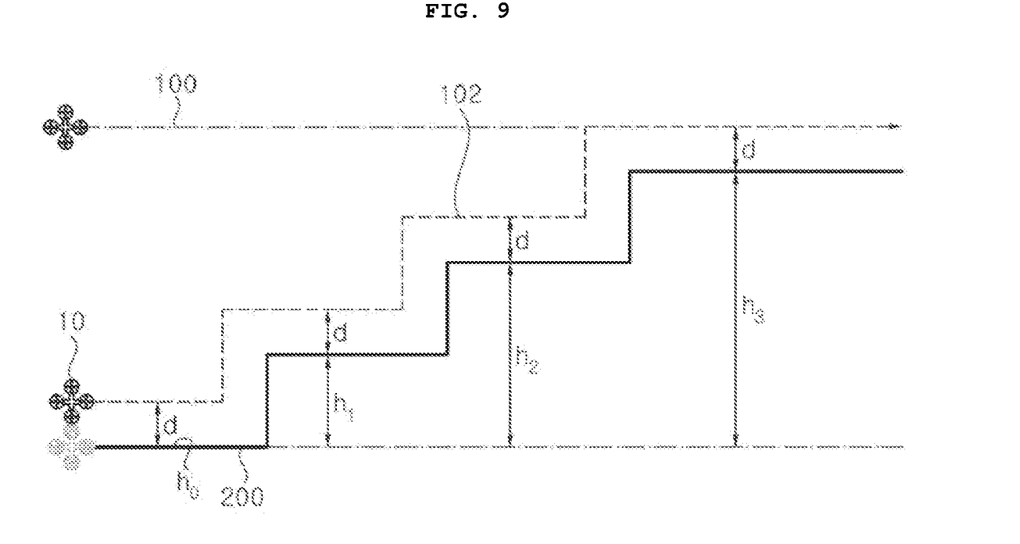
FIG. 9 is a diagram illustrating an embodiment according to the present invention in which the drone may fly at a certain height from the ground by reflecting a change in a height of a ground in a terrain such as terraced paddy field in the flight plan of the drone according to the flight plan reflecting altitude information.
Figure 10:
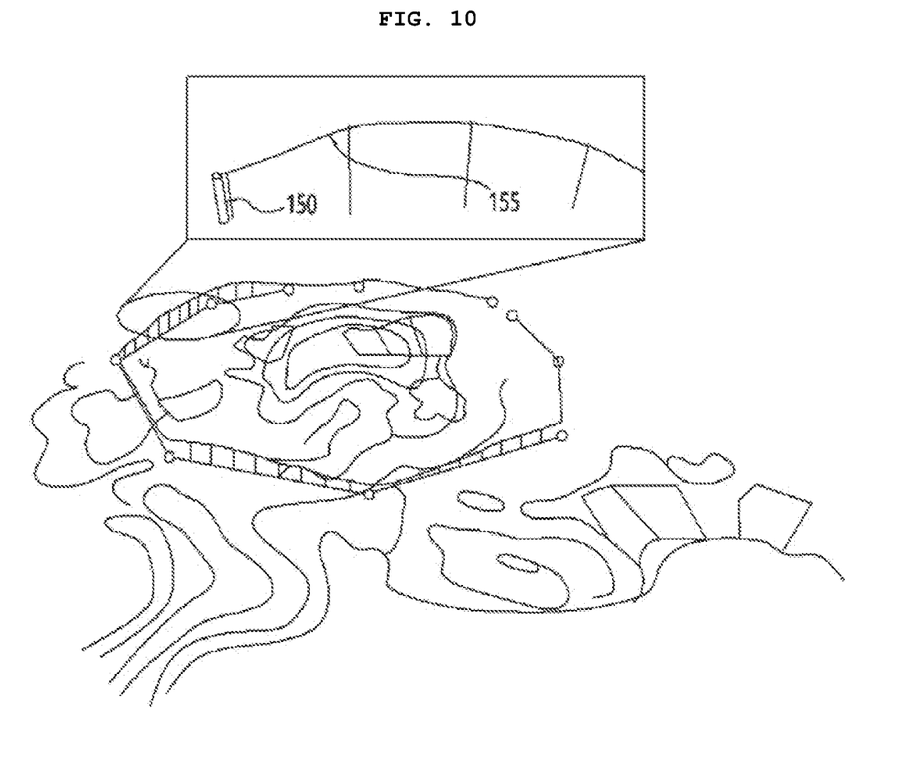
FIG. 10 is a diagram illustrating an actual drone ground control system (GCS) in which the flight plan in which the change in the height of the ground is modified by reflecting height data of a contour line to the flight path is implemented according to the present invention.

FIG. 1 is a diagram illustrating a flight path of a general drone that does not reflect a change in a height of a terrain, and illustrating that the drone flies at a certain height starting from a point where the drone first takes off, FIG. 2 is a diagram viewed from above to show in more detail the flight path of a drone flying over a terrain in which contour lines are shown, FIG. 3 is a diagram illustrating the flight path of the drone in which the drone according to the embodiment of the present invention is operated at a certain distance from a ground even if a height of the ground is changed by reflecting contour data, FIGS. 4 and 5 are conceptual views illustrating a drone control system according to the present invention, FIG. 6 is a flowchart illustrating a detailed sequence of a flight planning method reflecting a terrain contour line according to the present invention, FIG. 7 is a diagram illustrating a detailed sequence of a drone mission performance and flight information collection step according to an embodiment of the present invention, FIG. 8 is a flight result comparison analysis and flight information storing step according to an embodiment of the present invention, FIG. 9 is a diagram illustrating an embodiment in which a drone flies while maintaining a certain altitude with a stepped ground according to a flight plan in which altitude information is reflected in a stepped area according to the present invention, and FIG. 10 is a diagram illustrating an actual drone ground control system (GCS) in which a flight plan reflecting a height data of the contour line according to the present invention is implemented.

Referring to FIGS. 1 to 3, a flight path 100 of a general drone 10 in which a change in a height of a terrain is not reflected is as illustrated in FIG. 1, which illustrates that the drone is operated by being set high to operate at a height higher than maximum heights of buildings, ground structures, and mountains, etc. in setting the flight path in consideration of heights of a terrain features on a ground 200.

The flight path 100 may be set by reflecting data of a contour line 210 as illustrated in FIG. 2 so that a height of the ground 200 may be checked on the flight path 100 of the drone 10, and an optimized flight path 102 reflecting the height of the ground 200 is as illustrated in FIG. 3.

In FIG. 3, in order to reflect altitude map data to the flight path of the drone, GPS coordinates for a flight start point 110, a flight end point 120, and intermediate points d1 to d5 for the flight path 100 set first are obtained.

It shows that contour altitude information for the GPS coordinate points from the map data is obtained, and a flight height of a drone flight target by reflecting the altitude information obtained from the flight path point and the contour line is calculated and reflected.

Therefore, the optimized flight path 102 of the drone 10 according to the present invention operated at a certain separation distance d from the ground even if the height of the ground varies by reflecting the altitude information on the actual flight path 102 is shown.

The points are illustratively set as 5 points of d1 to d5, but it is possible to subdivide the points from the flight start point 110 to the flight end point 120 and set a plurality of points according to the user's settings.

Referring to FIGS. 4 and 5, a conceptual diagram of a drone control system according to the present invention is illustrated, and the drone 10 may include various sensors such as a 3-axis accelerometer, 3-axis gyroscope, a magnetometer, a GPS sensor, a distance measurement sensor, and a vision sensor, and may include a communication unit (not illustrated) for wireless communication. In addition, the drone 10 may further include a flight information collection unit 17.

The above-described sensors are known, and detailed description thereof will be omitted.

The drone 10 may be connected to the ground control system 30 by wireless communication to transmit and receive information, and may receive commands from the ground control system 30 to control the flight of the drone.

A cloud server 20 may be connected to the ground control system 30 by wireless communication, but is not limited thereto, and may also be connected to the drone 10 by wireless communication.

Accordingly, the drone 10 may be connected to the cloud server 20 by wireless communication and may upload and download information to and from the cloud server 20.

The drone 10 may collect the actual flight coordinates by the flight information collection unit 17 to understand the effects of changes in atmospheric environment during mission performance according to a flight plan, and may collect data for comparison with the flight plan or flight simulation content and upload the collected data to the cloud server 20. Accordingly, it is possible to secure data for modifying the flight plan during a next flight of a drone in a similar environment.

The cloud server 20 may include a weather information collection unit 21, a map data storage unit 22, a flight plan DB storage unit 23, a flight analysis DB storage unit 24, and an integrated DB processing unit 25.

When a drone flight zone is set, the weather information collection unit 21 collects weather information, such as wind direction, wind volume, temperature, and humidity of the flight zone, in real time.

The map data storage unit 22 updates and stores map data such as contour lines of terrains and building height data.

The flight plan DB storage unit 23 sets the flight zone and the flight path of the drone, reflects the real-time map data, and stores the flight plan reflecting the height data set by a user for mission performance.

The flight analysis DB storage unit 24 stores a DB analyzing the simulated flight, the flight plan, and the actual flight result of the drone.

The integrated DB processing unit 25 is connected to the weather information collection unit 21, the map data storage unit 22, the flight plan DB storage unit 23, and the flight analysis DB storage unit 24 to manage the DB in an integrated manner.

The ground control system 30 may include a flight plan derivation algorithm 31, a flight result analysis processing unit 32, and a flight simulator 33.

The flight plan derivation algorithm 31 of the ground control system 30 may reflect the map data in real time so that, when setting the drone flight path 100, the contour line and building height data stored in the map data storage unit 22 of the cloud server 20 according to the flight start point 110 and the flight end point 120 of the drone may be reflected, and derive the flight plan by reflecting the height data set by a user to perform the mission of the drone.

The flight result analysis processing unit 32 may compare and analyze the simulated flight, the flight plan, and the actual flight result of the drone, confirm the changed map data or flight plan, and process whether or not it is reflected in the DB.

Therefore, when there are changes, the changes may be reflected to the map data stored in the map data storage unit 22 of the cloud server 20, the changes may be reflected to the flight plan DB stored in the flight plan DB storage unit 23, or the changes may be reflected to both the map data storage unit 22 and the flight plan DB storage unit 23.

Accordingly, when setting the same flight zone or flight path later, the data stored through the DB of the cloud server 20 may be called and the mission may be performed.

The flight simulator 33 performs the flight simulation through the flight plan DB stored in the cloud server 20, and checks whether the drone may fly at a certain altitude without any abnormality according to the change in the altitude of the ground during the actual flight of the drone according to the flight plan.

As one example, the flight simulator 33 may call the flight plan DB stored in the cloud server 20 to check the flight plan, display a virtual drone image in a virtual space corresponding to an area set in the flight plan, and vary the position of the virtual drone image based on the altitude, speed, time, direction, and the like of the drone set in the flight plan, thereby performing the simulation.

On the other hand, the flight result analysis processing unit 32 may include a flight result comparison analysis algorithm 321.

The flight result analysis processing unit 32 may compare and analyze whether the drone 10 performed the actual flight according to the flight plan through the flight result comparison analysis algorithm 321 after the mission performance of the drone 10 is completed.

Here, the flight result comparison analysis algorithm 321 compares and analyzes the flight plan and the flight result, and when the result of comparing and analyzing the flight plan and the flight result is out of a preset normal range, the flight plan may be modified.

As an example, the flight result comparison analysis algorithm 321 may collect the flight coordinates of the drone 10 according to the flight plan from the flight plan DB storage unit 23 of the cloud server 20, collect a log data set acquired from the actual flight of the drone, extract virtual flight data sets through flight simulation according to the flight coordinates, and compare and analyze the actual flight log data set of the drone 10 and virtual flight data set.

In addition, the flight result comparison analysis algorithm 321 reflects an external factor of wind and an obstacle object based on the flight coordinates in an abnormal situation where a position, speed, and altitude determined as a result of analyzing the flight plan and the flight result do not match a predicted range to update the flight plan by modifying the flight coordinate, speed, mission type, and control commands accordingly, and generates an update history and analysis data of the corresponding flight plan and stores the generated update history and analysis data in the flight analysis DB storage unit 24 of the cloud server 20.

FIGS. 6, 7 and 8, illustrate a method of establishing a flight plan reflecting contour lines of terrains according to the present invention, and in the drone type setting step (S100), a drone type suitable for drone flight characteristics such as forest prevention or forest monitoring may be set, and next, in the drone flight zone setting step (S110), a flight zone in which the drone set in the step (S100) will fly may be set.

Next, when the flight zone is set in the drone flight zone setting step (S110), in the real-time weather information collection step (S111) of collecting weather information according to the set flight zone from the real-time weather information of the cloud server 20, weather information such as wind direction, wind volume, temperature and humidity may be collected in real time.

Next, it is possible to set the flight path by selecting the flight start point 110 and the flight end point 120 so that the flight path in which the drone will fly is set in the flight zone set in the drone flight path setting step (S120).

Next, in the map flight plan derivation algorithm application step (S130), when a scheduled flight path in which the drone will fly is set in the drone flight path setting step (S120), the map data according to the change in the altitude of the ground is generated by automatically reflecting the contour lines and building height data according to the flight path set in the map data reflection step (S121) to the DB of the map data storage unit stored in the cloud server 20 in real time.

Next, in the flight plan derivation step (S140), after the flight plan derivation algorithm is applied, the flight plan reflecting the height data according to the user setting is derived.

That is, when a user sets the desired separation distance (for example, 0.5 m to 2 m) from the ground, the height data is automatically reflected to the flight path as much as the corresponding separation distance to derive a flight plan according to the optimized flight path.

Next, in the flight plan storage and drone transmission step (S150), the flight plan derived in the step (S140) is stored in the cloud server 20 and transmitted to the drone 10.

In the step (S160) of selecting whether to perform the flight simulation, it is selected whether to perform the flight simulation through the flight plan stored in the flight plan DB storage unit 23 of the cloud server 20, when the flight simulation is performed, in the step (S165), it checks whether the drone may fly at a certain altitude without any abnormality according to the change in the altitude of the ground during the actual flight according to the flight plan. In the step (S165), if an abnormal state is confirmed, the process proceeds to the drone flight zone setting step (S110). In the step (S165), if the abnormal state is not confirmed, the process proceeds to the next step, which is the step (S170).

As one example, in the step (S160) of selecting whether to perform the flight simulation, when the flight simulation is performed, the flight plan DB stored in the flight plan DB storage unit 23 of the cloud server 20 may be called to check the flight plan, a virtual drone image may be displayed in a virtual space corresponding to an area set in the flight plan, and the position of the virtual drone image may vary based on the altitude, speed, time, direction, and the like of the drone set in the flight plan, thereby performing the simulation.

The drone mission performance and flight information collection step (S170) is a step of collecting the flight information to check whether the drone normally flies according to the flight plan, and includes a step of collecting information on the mission performance state of the drone, such as the position, flight path, and flight height of the drone. The flight information collected in the drone mission performance and flight information collection step (S170) means the position, flight path, flight height, etc. collected during the actual flight of the drone according to the previously set flight plan.

Accordingly, in the drone mission performance and flight information collection step (S170), in order to understand the effect of changes in the atmospheric environment during the mission performance of the drone, by collecting the actual flight coordinates of the drone and collecting data for comparison with the flight plan or flight simulation content, it is possible to secure data for modifying the flight plan during a next flight of the drone in a similar environment.

Here, the mission performance may mean forest prevention or forest monitoring, but is not limited thereto, and drones may be used for other purposes such as logistics and transportation.

When the set value set by the user is out of a certain standard (for example, ±0.3 m) or more in the performing of the drone mission performance and flight information collection step (S170), the process proceeds to the emergency stop step (S171), proceeds to the mission performance stop step (S172) at the same time as the emergency stop, proceeds to the step (S173) of adjusting a separation distance to the set value, and when the separation distance is adjusted to the set value, proceed to the drone flight and flight information collection step (S175) with the adjusted separation distance at the same time as the mission performance stop release step (S174).

The mission performance according to the flight plan is performed in the drone mission performance and flight information collection step (S170) according to the flight plan, and it is checked whether to perform the emergency stop by confirming the separation distance d from the ground 200 through the distance measurement sensor of the drone during the mission performance of the drone.

In the emergency stop step (S171), when the separation distance d from the ground 200 through the distance measurement sensor is out of the set value by more than a certain standard (for example, ±0.3 m), the emergency stop proceeds, the drone is switched to a hovering state at the same time as the emergency stop, and proceeds to the mission performance stop step (S172) of temporarily stopping the mission performance in progress.

Next, in the step of adjusting the separation distance to the set value (S173), the separation distance d from the ground through the distance measurement sensor of the drone 10 is adjusted to the set value.

Next, the separation distance is adjusted to the set value in the step of temporarily releasing the mission performance (S174), and at the same time, the temporary stop of the mission performance is released to continue the mission performance.

In the drone flight and flight information collection step with the adjusted separation distance (S175), the drone performs a mission while flying with the adjusted separation distance value from the ground, and the flight information according to the changed content may be collected.

As a result, drones can fly while maintaining a certain separation distance from the ground. Accordingly, when spraying chemicals for prevention such as prevention for migratory bird habitats including slopes or forests with a change in a height of a ground using drones, the drones may spray the chemicals at all times while maintaining a certain distance over the ground or in the forest to increase the chemicals spraying effect, and when the separation distance d is out of the set value, the chemicals spraying is temporarily stopped, and thus, it is possible to reduce the amount of chemicals used.

Next, in the step (S180) of selecting whether to compare and analyze the flight result after completing the mission performance and flight information collection, when the comparison analysis of the flight result is selected, the flight result comparison analysis and flight information storing step (S190) is performed.

In the flight result comparison analysis and flight information storing step (S90), when the flight simulation is performed, the changed map data or flight plan is checked by comparing the simulated flight information with the flight plan information and the flight information collected during the actual flight, and is reflected to the map data storage unit 22 or the flight plan DB storage unit 23 of the cloud server 20. Here, the information reflected to the map data storage unit 22 or the flight plan DB storage unit 23 of the cloud server 20 may be applied when the next flight plan is established. On the other hand, when the flight simulation is not performed, the changed map data or flight plan is checked by comparing the flight plan information with the flight information collected during the actual flight, and is reflected to the map data storage unit 22 or the flight plan DB storage unit 23 of the cloud server 20.

In addition, in the flight result comparison analysis and flight information storage step (S190), the step (S191) of comparing and analyzing the flight plan and the flight result (S191), the step (S192) of determining the normal range, and the step (S193) of modifying the flight plan in case of the abnormal range may be performed.

In the step (S191) of comparing and analyzing the flight plan and the flight result, the flight coordinates of the drone according to the flight plan from the flight plan DB storage unit 23 of the cloud server 20 are collected, the log data set acquired from the actual flight of the drone is collected, the virtual flight data set is extracted through the flight simulation according to the flight coordinates, and the actual flight log data set of the drone and virtual flight data set are compared and analyzed.

In the step (S192) of determining the normal range, when the position, speed and altitude determined as a result of analyzing the flight plan and the flight result do not match the predicted range, it is determined as an abnormal range.

In the step of modifying the flight plan (S193), in the abnormal range, by reflecting the external factors of wind and obstacle objects based on the flight coordinates, the flight coordinate, speed, mission type, and control commands are modified accordingly, and the update history and analysis data of the corresponding flight plan are generated and stored in the flight analysis DB storage unit 24 of the cloud server 20.

In the additional mission selection step (S195), it is selected whether to perform an additional mission, and when performing the additional mission, the process proceeds to the drone type setting step according to the flight characteristics of the drone, and when not performing the additional mission, the process ends.

FIG. 9 illustrates an embodiment in which a drone flies while maintaining a certain altitude from the ground according to a flight plan to which altitude information is reflected in an area where there is a sharp change in height, such as a terraced paddy field according to the present invention, and the flight path of the drone in which the drone flies at the initially set flight height because the flight path 100 of the drone does not reflect the information on the change in the altitude of the ground. According to the present invention, the drone 10 according to the present invention extracts the height data from the map data, and changes in heights (h1, h2, h3, etc.) of the ground are reflected to the flight plan according to the algorithm of the present invention, and thus, an example is shown in which the drone 10 flies while maintaining the constant separation distance d from the ground even when the ground height is changed (h1→h2→h3).

As a result, in a situation where the drone is operated for the purpose of prevention nematode in mountainous areas, prevention migratory bird habitats including hill areas, or the like, when a situation arises in which the drone needs to be operated at a certain height from the ground 200 in the mountainous areas, that is, in case where the vehicle needs to be operated at a certain separation distance from the ground despite the change in the height of the ground, it is possible to perform effective control by establishing the flight plan that reflects the relative height of the drone 10 from the ground 200 rather than flying at an absolute height.

In addition, the terraced paddy field is a rice paddy constructed on a ridge, and when the terraced paddy field is controlled using a drone, it is necessary to perform prevention by establishing flight plans of individual drones using each height data for each terraced paddy field, and therefore, it is inconvenient to establish a new flight plan by setting the height for each terraced paddy field. However, in the present invention, since the height change data for the terraced paddy fields may be reflected, even if the drone establishes the flight plan to perform prevention in several terraced paddy fields in succession, the drone may perform the effective control while maintaining a certain height from each terraced paddy field.

FIG. 10 illustrates the actual drone ground control platform (GCS) in which the flight plan reflecting the height data of the contour line according to the present invention is implemented.

It shows a web-based platform in which a first flight altitude 150 indicating the flight altitude standard for the drone flight and a second flight altitude 155 indicating the flight altitude at which the contour altitude data and the height setting value for mission performance according to the user setting are reflected, that is, the flight plan is reflected, and thus, the flight path is expressed in 3D on a separate real map rather than an open source.

The web-based platform basically uses Hyper Text Markup language (HTMl) and JavaScript, and is similar to the Java-based SW platform method that minimizes the dependency of the application according to the change of the CPU and may reduce the dependency of the application on the HW.

The web-based platform has a web engine that may process HTML and JavaScript, and may relieve HW dependency on the web engine, and refers to a platform in which a web browser and an operating system are combined so that web applications are optimally executed on a device.

Thereby, in setting the flight path 100 of the drone 10, the user easily reflects the height of the ground 200 and sets the optimized flight path 102, so that even if the drone 10 is operated in flat and mountainous areas, the drone sets the drone flight path so that the drone may be operated stably while maintaining a certain separation distance d from the ground 200. Accordingly, the drone is automated by setting the drone flight path and applying an algorithm, and thus, may be operated while maintaining a certain distance from a ground of a mountain by reflecting a ground slope of a mountain when setting a path of the drone passing through a mountain or a hill.

As described above, the present invention has been described with reference to the embodiments illustrated in the drawings, but this is merely exemplary, and those of ordinary skill in the art to which various applications and other embodiments are possible. Accordingly, a true technical scope of the present invention is to be determined by the spirit of the appended claims.

Although specific embodiments of the intelligent flight planning method according to the present invention and the drone control system using the same have been described so far, it is apparent that various implementation modifications are possible without departing from the scope of the present invention. The scope of the present invention should not be conveyed limited to the described embodiments, and should be defined by the following claims as well as equivalents to the claims.

That is, it is to be understood that the exemplary embodiment described above is not restrictive, but is illustrative in all aspects, the scope of the present invention is defined by the claims to be provided below rather than the detailed description, and it is to be understood that all the modifications or alterations deriving from the meaning and the scope of the claims and equivalents thereto fall within the scope of the present invention.

INDUSTRIAL APPLICATION

The present invention provides drone control system and intelligent drone flight planning method thereof that establishes a flight plan by reflecting contour height data of a geographic information system to enable the drone to fly while maintaining a certain distance from a ground at all times even if a height of a ground is changed, and may a chemicals spraying effect when spraying chemicals for prevention such as prevention for migratory bird habitats including slopes or forests with a change in a height of a ground to save the amount of chemicals used.

The invention claimed is:

1. A drone control system, comprising:
    a flying drone;
    a cloud server configured to transmit and receive information to and from the drone by wireless communication; and
    a ground control device configured to:
    set a type of the drone according to a flight characteristic of the drone;
    set a flight zone in which the drone flies;
    set a flight path of the drone by reflecting real-time weather information in the set flight zone, and establish a flight plan of the drone by connecting the drone and the cloud server by the wireless communication;
    apply a derivation algorithm of the flight plan for reflecting a height extracted from map data to the flight path of the drone;
    derive the flight plan by reflecting a contour line and building height data stored in the cloud server in real time according to a flight start point and a flight end point of the drone, and reflecting height data set by a user for mission performance of the drone when setting the flight path of the drone, according to the derivation algorithm of the flight plan;
    store the derived flight plan in the cloud server;
    transmit the flight plan to the drone to instruct the drone to perform a mission according to the flight plan, and collect fight information of the drone;
    check a change in map data or the flight plan, and check whether the change is reflected in a flight plan database (DB) in the cloud server, by comparing and analyzing a simulated flight and the flight plan of the drone, and a result of an actual flight of the drone, stored in the flight plan DB; and
    check whether the drone flies at a certain altitude without abnormality according to a change in a ground contour during the actual flight of the drone according to the flight plan by performing flight simulation through the flight plan DB stored in the cloud server.

2. The drone control system of claim 1, wherein the drone is further configured to collect coordinates of the actual flight of the drone to understand effects of changes in atmospheric environment during mission performance according to the flight plan, and collect data for comparing with the flight plan or flight simulation content to secure data for modifying the flight plan during a next flight of the drone in a similar environment.

3. The drone control system of claim 1, wherein the ground control device is further configured to store a flight result comparison analysis algorithm that compares and analyzes whether the drone actually performs the flight according to the flight plan after completing the mission performance of the drone, and
    the ground control device is further configured to, by using the flight result comparison analysis algorithm, compare and analyze the flight plan and flight result, and modify the flight plan when the result of comparison analysis of the flight plan and flight result is out of a preset normal range.

4. The drone control system of claim 3, wherein the ground control device is further configured to, by using the flight result comparison analysis algorithm, collect coordinates of the flight of the drone according to the flight plan from the cloud server, and collect log data set obtained from the actual flight of the drone, and
    the ground control device is further configured to, by using the flight result comparison analysis algorithm, extract a virtual flight data set through the flight simulation according to the coordinates, and compare and analyze the actual flight log data set and the virtual flight data set of the drone.

5. The drone control system of claim 3, wherein the ground control device is further configured to, by using the flight result comparison analysis algorithm, reflect an external factor of wind and an obstacle object based on coordinates of the flight in an abnormal situation where a position, speed, and altitude determined as a result of analyzing the flight plan and the flight result do not match a predicted range to update the flight plan by modifying the coordinate, the speed, a mission type, and a control command accordingly, generate an update history and analysis data of a corresponding flight plan, and store the generated update history and analysis data in the cloud server.

6. The drone control system of claim 1, wherein the cloud server is configured to:
    collect real-time weather information of a flight zone in which the drone flies;
    update and store map data including a contour line and building height data of a terrain of the flight zone in which the drone flies;
    reflect real-time map data when setting the flight zone and the flight path to which the drone flies, and store the flight plan reflecting the height data set by a user for mission performance; and
    store a database (DB) obtained by analyzing the simulated flight, the flight plan, and the actual flight result of the drone.

7. The drone control system of claim 1, wherein the ground control device is further configured to call the flight plan DB stored in the cloud server to check the flight plan, display a virtual drone image in a virtual space corresponding to an area set in the flight plan, and vary a position of the virtual drone image based on the altitude, speed, time, and direction of the drone set in the flight plan to perform the flight simulation.

8. An intelligent flight planning method, comprising:
setting a type of a drone according to a flight characteristic of the drone;
setting a flight zone in which the drone flies;
setting a flight path of the drone by reflecting real-time weather information in the set flight zone;
applying a flight plan derivation algorithm for reflecting a height extracted from map data to the flight path of the drone;
deriving a flight plan reflecting a flight height set by a user to the flight path according to the flight plan derivation algorithm;
storing the flight plan derived through the deriving of the flight plan in a cloud server and transmitting the flight plan to the drone;
performing a mission of the drone according to the flight plan and collecting flight information; and
comparing and analyzing the flight plan, an actual flight result, and a simulated flight result, and storing the flight result,
wherein, in the performing of the mission of the drone and the collecting of the flight information, coordinates of the actual flight of the drone are collected to understand an effect of a change in atmospheric environment during the mission performance of the drone, and data for comparing with the flight plan of the drone or flight simulation content of the drone, is collected to secure data for modifying the flight plan during a next flight of the drone in a similar environment.

9. The intelligent flight planning method of claim 8, further comprising:
after the storing the flight plan and the transmitting the flight plan to the drone, selecting whether to perform flight simulation through the flight plan stored in the cloud server.

10. The intelligent flight planning method of claim 9, further comprising:
after the performing of the mission of the drone and collecting of the flight information, selecting whether to compare and analyze the actual flight result with the flight plan or a simulated flight plan of the drone; and additionally selecting whether to perform a mission to be additionally performed.

11. The intelligent flight planning method of claim 8, wherein, in the setting of the flight zone of the drone, when setting the flight zone in which the drone flies, a difference between the actual flight and the flight plan according to the flight plan is reduced by collecting and reflecting weather information of the set flight zone from real-time weather information of the cloud server.

12. The intelligent flight planning method of claim 8, wherein, in the applying of the flight plan derivation algorithm, when setting a scheduled flight path in which the drone flies, height data set by the user according to the set flight path is extracted from the real-time map data of the cloud server, and a change in a height of a ground is reflected to the flight height to establish the flight plan so that the drone flies at a certain distance from the ground.

13. The intelligent flight planning method of claim 9, wherein, in the selecting whether to perform the flight simulation, when the flight simulation is performed, it is checked whether the drone flies while maintaining a certain distance from a ground without abnormality according to a change in a ground contour during the actual flight according to the flight plan established by reflecting the change in a height of the ground, and if it is checked that there is no problem, it proceeds to the performing of the mission of the drone and the collecting of the flight information according to the flight plan uploaded to the drone.

14. The intelligent flight planning method of claim 8, wherein, the performing of the mission of the drone and the collecting of the flight information includes collecting data of a position of the drone and the flight path of the drone during the mission performance of the drone and information of a distance from a ground through a distance measurement sensor of the drone.

15. The intelligent flight planning method of claim 8, wherein, the comparing and analyzing of the flight result and the storing of the flight information includes checking whether the actual drone flies normally according to the flight path in the planned flight plan or the simulated flight path due to a change in external atmospheric environment including an effect of wind during the actual flight of the drone, and if there is a difference, analyzing and storing in which part there is the difference.

* * * * *